United States Patent
Doi et al.

(10) Patent No.: US 6,908,141 B2
(45) Date of Patent: Jun. 21, 2005

(54) STRUCTURAL MEMBER FOR CAR AND CAR BODY FABRICATED USING THE MEMBER

(75) Inventors: Hiroyuki Doi, Tokai (JP); Takashi Motoyoshi, Tokai (JP); Tsutomu Takachi, Tokai (JP); Masanobu Kawase, Toyota (JP); Nobuyasu Yamada, Toyota (JP)

(73) Assignee: Nippon Steel Corporation, Tokyo (JP)

( * ) Notice: Subject to any disclaimer, the term of this patent is extended or adjusted under 35 U.S.C. 154(b) by 110 days.

(21) Appl. No.: 10/469,264

(22) PCT Filed: Feb. 26, 2002

(86) PCT No.: PCT/JP02/01756

§ 371 (c)(1),
(2), (4) Date: Aug. 26, 2003

(87) PCT Pub. No.: WO02/068232

PCT Pub. Date: Sep. 6, 2002

(65) Prior Publication Data

US 2004/0075296 A1 Apr. 22, 2004

(30) Foreign Application Priority Data

Feb. 26, 2001 (JP) ........................................ 2001-049800

(51) Int. Cl.$^7$ ................................................ B60J 5/00
(52) U.S. Cl. ................................. 296/146.6; 296/187.12
(58) Field of Search ........................ 296/146.6, 187.12, 296/193.05

(56) References Cited

U.S. PATENT DOCUMENTS

| | | | | |
|---|---|---|---|---|
| 5,093,990 A | * | 3/1992 | Klippel ..................... | 296/146.6 |
| 5,232,261 A | * | 8/1993 | Kuroda et al. ............ | 296/146.6 |
| 5,256,219 A | * | 10/1993 | von Hagen et al. ...... | 296/146.6 |
| 5,277,469 A | * | 1/1994 | Klippel ..................... | 296/146.6 |
| 6,020,039 A | * | 2/2000 | Cline et al. ............... | 296/146.6 |
| 6,332,302 B1 | * | 12/2001 | Asai ......................... | 296/146.6 |

FOREIGN PATENT DOCUMENTS

| | | | |
|---|---|---|---|
| JP | 06040255 A | * 2/1994 | .............. 296/146.6 |
| JP | 06048177 | 2/1994 | |
| JP | 00789345 | 4/1995 | |
| JP | 03023812 | 2/1996 | |
| JP | 09240400 | 9/1997 | |
| JP | 09290698 | 11/1997 | |

* cited by examiner

Primary Examiner—Lori L. Coletta
(74) Attorney, Agent, or Firm—Baker Botts LLP (57) ABSTRACT

A structural member usable for a car capable of demonstrating excellent flexural strength and absorbed energy performance and, moreover, capable of realizing weight reduction and is a structural member for a car being formed with a high-tensile steel pipe having a material property of not less than 1,400 MPa in tensile strength and not less than 5% in elongation. The structural member has a closed section structure which is provided as the configuration of the cross section perpendicular to the direction of the longitudinal axis. The cross-sectional configuration satisfies the following expression when a is defined as the maximum length of said cross-sectional configuration in the longitudinal direction, when b is defined as the maximum length thereof in the direction perpendicular to said direction, when L is defined as the circumferential length thereof, and when t is defined as the wall thickness of the steel pipe, $0.65 \leq b/a \leq 0.75$, $0.014 \leq t/L \leq 0.020$ and preferably, the structural member is disposed so that the longitudinal direction of the cross-sectional configuration of the structural member coincides with the direction of the collision of a car body when the structural member is attached to the car body.

12 Claims, 7 Drawing Sheets

- ▨ MAXIMUM LOAD (kN) (1 = 950 mm)
- ☐ ABSORBED ENERGY (× 100 J) (1 = 950 mm)

Fig.10

STRUCTURAL MEMBER FOR CAR AND CAR BODY FABRICATED USING THE MEMBER

CROSS REFERENCE TO RELATED APPLICATION(S)

This application is a national stage application of PCT Application No. PCT/JP02/01756 which was filed on Feb. 26, 2002 and published on Sep. 6, 2002 as International Publication No. WO 02/068232 (the "International Application"). This application claims priority from the International Application pursuant to 35 U.S.C. §365. The present application also claims priority under 35 U.S.C. §119 from Japanese Patent Application No. 2001-49800, filed on Feb. 26, 2001, the entire disclosure of which is incorporated herein by reference.

FIELD OF THE INVENTION

The present invention relates to a structural member for a car, such as a door-impact-protection beam which is a door stiffening member, a pillar stiffening member, a bumper stiffening member, etc., capable of providing excellent flexural strength and absorbed energy performance, and moreover, capable of realizing weight reduction and to a car body fabricated using the structural member for a car.

BACKGROUND INFORMATION

Previously, a structural member for a car, such as a door-impact-protection beam which is a door stiffening member, has been widely used for securing the safety of a driver in the case of a lateral collision of a car. As a door-impact-protection beam, an ultra-high-tensile steel pipe has been adopted for securing collision safety and realizing low fuel consumption by weight reduction. As a material for such a steel pipe, a material having a tensile strength of not less than 1,400 MPa and a cross section of a perfect circle has been conventionally used.

It is preferable to further reduce fuel consumption by reducing the weight of car components and the like, and thus a lighter door-impact-protection beam in weight is required. Therefore, a door-impact-protection beam having the thinnest possible wall thickness may be desired. However, as a door-impact-protection beam can be used for securing safety at the time of collision and is required to secure flexural strength and absorbed energy performance more than a certain level, the weight reduction of a conventional door-impact-protection beam having a cross section of a perfect circle may have reached a limit.

One of the objects of the present invention is to provide a structural member for a car, such as a door-impact-protection beam which is a door stiffening member, a pillar stiffening member, a bumper stiffening member, etc., which structural member being capable of solving the above-mentioned conventional problems, having flexural strength and absorbed energy performance equal to or exceeding a conventional steel pipe with a circular cross section when a car collision (for example, a head-on collision, a lateral collision, etc.), particularly a lateral collision, occurs, and moreover being capable of attain weight reduction further than a conventional structural member and a car body fabricated using said structural member for a car.

SUMMARY OF THE INVENTION

The present invention is provided for solving at least some of the above-mentioned problems. According to an exemplary embodiment of the present invention, a structural member for a car is provided. Such member can be formed of a high-tensile steel pipe having a material property of at least 1,400 MPa in tensile strength and at least than 5% in elongation. The member may also have a cross-sectional configuration of a closed section structure and the cross-sectional configuration satisfying the expression $$0.65 \leq b/a \leq 0.75,$$

$$0.014 \leq t/L \leq 0.020,$$

such that a as the maximum length of said cross-sectional configuration in the longitudinal direction, b is the maximum length thereof in the direction perpendicular to said direction, L is the circumferential length thereof, and t is the wall thickness of the steel pipe.

The cross-sectional configuration may have a linear portion at at least one portion of the sides. All of the sides of said cross-sectional configuration may be formed with curves and/or can be provided in a shape of an ellipse. The member can be disposed so that the longitudinal direction of the cross-sectional configuration thereof coincides with the direction of the collision of a car body when the structural member is attached to the car body. The member may be used as a door-impact-protection beam disposed so that the longitudinal direction of the cross-sectional configuration thereof coincides with the direction of the lateral collision of a door when the structural member is attached to the door.

According to another exemplary embodiment of the present invention, a car body can include a structural member as described above, which is disposed so that the longitudinal direction of the cross-sectional configuration of said structural member coincides with the direction of the collision of the car body.

DETAILED DESCRIPTION

The exemplary embodiments according to the present invention shall be described hereunder by taking, as an example, the case where a structural member for a car according to the present invention is used as a door-impact-protection beam attached to a car body and by referring to the drawings. It should be understood that other examples are conceivable, and are within the scope of the present invention.

An exemplary door-impact-protection beam according to the present invention can be formed with a high-tensile steel pipe whose cross-section perpendicular to the long axis has a closed section structure. The steel pipe may be formed from a steel strip having a material property of at least than 1,400 MPa in tensile strength, and at least than 5% in elongation and a chemical composition containing, in weight, for example, C: 0.24%, Si: 0.25%, Mn: 2.4%, Cr: 0.5%, Mo: 0.7%, Ti: 0.03%, B: 20 ppm, the balance consisting of Fe and unavoidable impurities.

The cross-sectional configuration satisfies the expression <1> below when defining a as the maximum length of said cross-sectional configuration in the longitudinal direction, b as the maximum length thereof in the direction perpendicular to such direction, L as the circumferential length thereof, and t as the wall thickness of the steel pipe, $$0.65 \leq b/a \leq 0.75,$$

$$0.014 \leq t/L \leq 0.020 \qquad <1>.$$

Preferably, the beam can be disposed so that the longitudinal direction of the cross-sectional configuration thereof coincides with the direction of the lateral collision when the beam is attached to a door.

The cross-sectional configuration of an exemplary beam according to the present invention may be designed based on the configuration which is inscribed in a rectangle, each corner portion of which is rounded in the shape of a circular arc. By forming each corner portion in a shape of a circular arc, the occurrence of cracks and buckling, caused by excessive stress concentration at each corner portion when an impact load is imposed, can be prevented.

Exemplary reasons for providing and/or limiting the above-mentioned dimensions of the cross-sectional configuration shall be described in further detail herein below.

Figure 1:
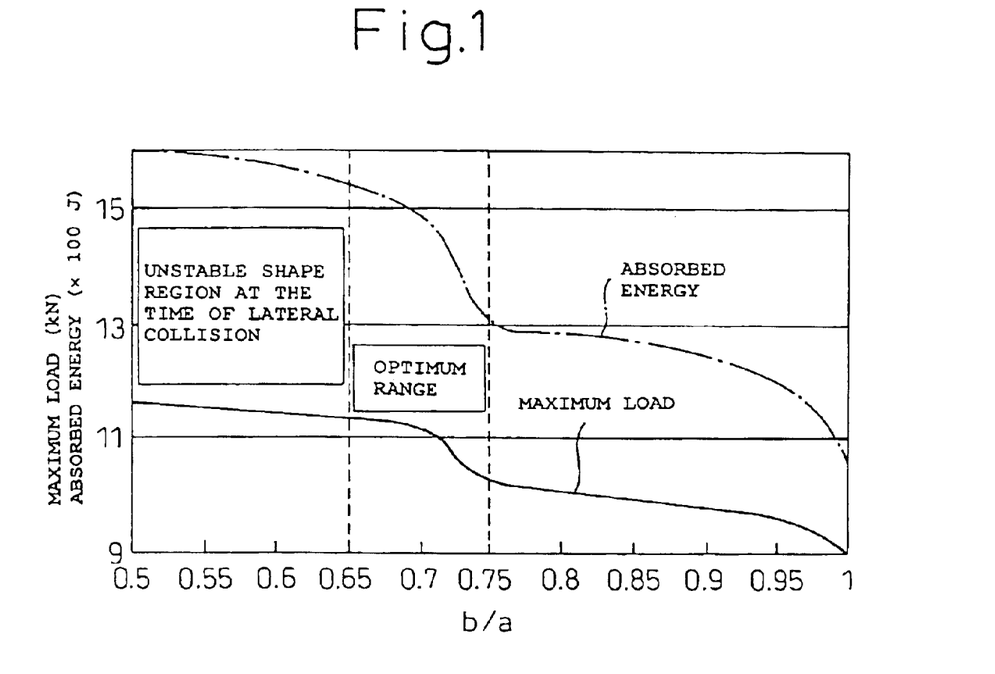
FIG. 1 is a graph showing a relation of sides of a structural member according to the present invention with a maximum load and an absorbed energy when quadrilateral beams (which have an identical weight to a beam having a circular cross-section of a diameter of 31.8 mm×a thickness of 1.6 mm, and the ratios of b to a being changed variously) are subjected to a three-point bending test at a span of 950 mm.

First, the limiting conditions of length proportion b/a is as follows. FIG. 1 illustrates a graph evaluating the bending property in terms of the maximum load and the absorbed energy amount when the steel pipes having an identical cross-sectional area are subjected to the three-point bending test with a load being imposed from the same direction as the longitudinal direction of the cross-sectional configuration, while varying the values of b/a.

When the value of b/a is gradually reduced from a round shape (b/a=1), both the maximum load and the absorbed energy can increase, and they radically increase in the range of $0.65 \leq b/a \leq 0.75$. In the range of b/a<0.65, though the bending property still improves, the long side a (the maximum length in the longitudinal direction) becomes too large compared with the short side b (the maximum length in the direction perpendicular to the longitudinal direction). Thus the beams in their configurations become unstable, the twist and rotation of the beams occur at the time of a lateral collision, and therefore, the original performance of the beams may not be demonstrated and a problem of safety may occur. Another possible problem that may occur is that the beam may not be accommodated in a door because of the constraint on the space.

For that reason, it is preferable that b/a is controlled in the range of $0.65 \leq b/a \leq 0.75$.

Figure 2:
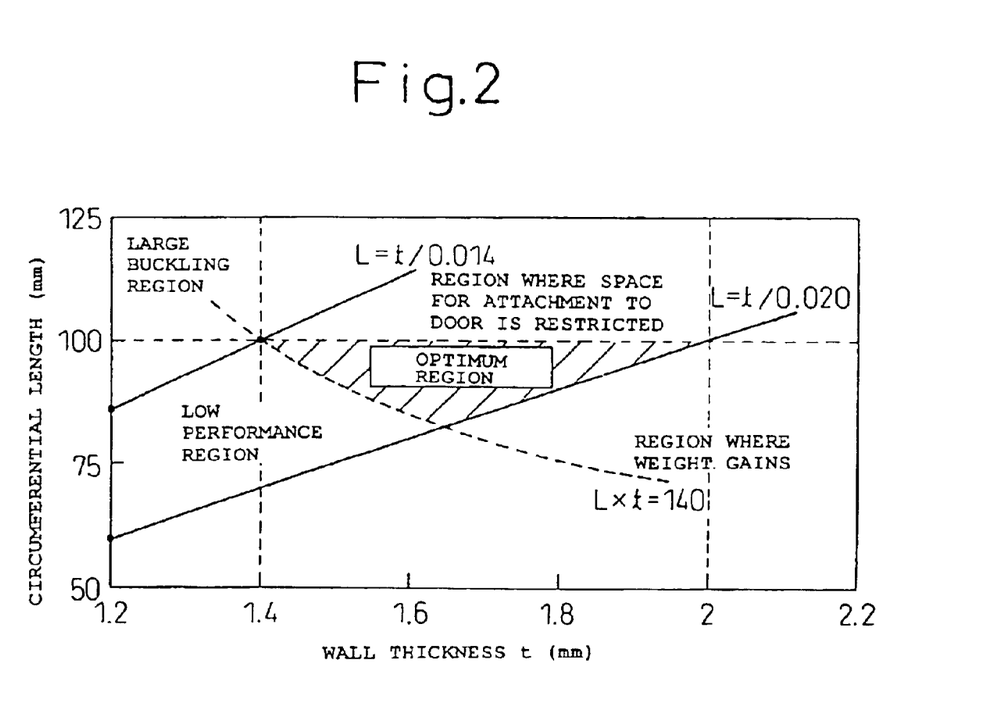
FIG. 2 is a graph showing an example of the relation between the wall thickness t and the circumferential length L.

Second, the limiting conditions of t/L is described as follows. For determining a cross-sectional configuration effective for securing the safety at the time of a collision, in addition to the value of b/a, the ratio of the wall thickness t to the circumferential length L, namely t/L, is an important parameter. FIG. 2 shows a graph indicating the relation between t and L when b/a is in the above range ($0.65 \leq b/a \leq 0.75$).

In the range of t/L<0.014, since L can be large compared to t, buckling tends to occur and cracking, after the buckling, tends to occur. On the other hand, in the range of t/L>0.020, though the bending property is good, the weight tends to increase since t is large compared with L and that is contrary to the purpose of the invention.

When a beam is attached to an actual door, in addition to the limitation range of $0.014 \leq t/L \leq 0.020$, L is restricted by the space in a door for attaching the beam and t is also restricted by the requirement of weight reduction. Moreover, L and t have to be in the region where the beam has sufficient bending property, and the optimum region (the portion of oblique lines in FIG. 2, in the case of K=140) is the region where the product of L and t satisfies the expression L×t>K (in this exemplary embodiment, K may be determined by the requirement for the performance of a door).

Figure 4:
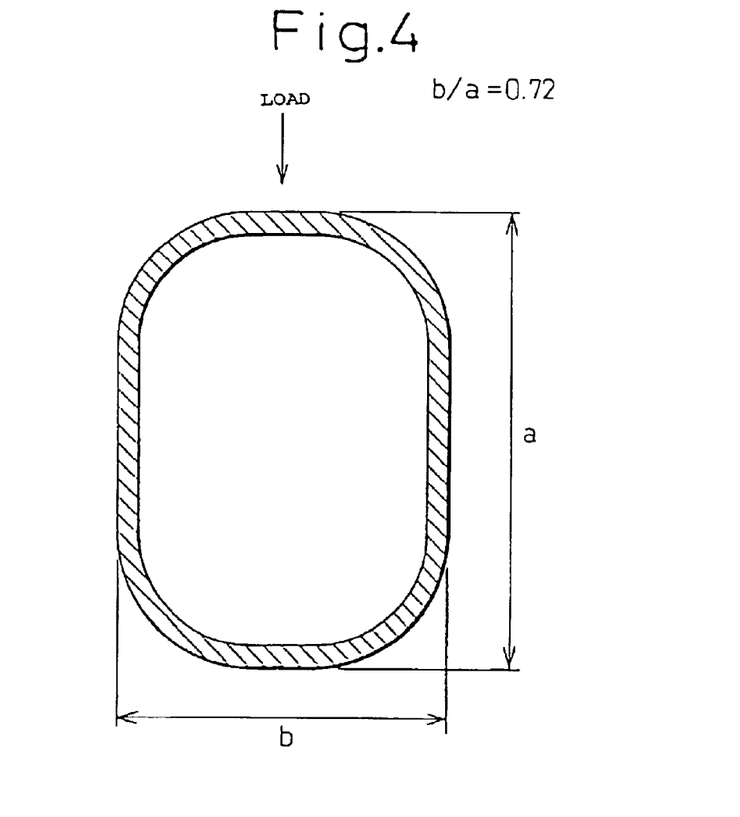
FIG. 4 is a sectional view showing an exemplary embodiment of the structural member according to the present invention.
Figure 5:
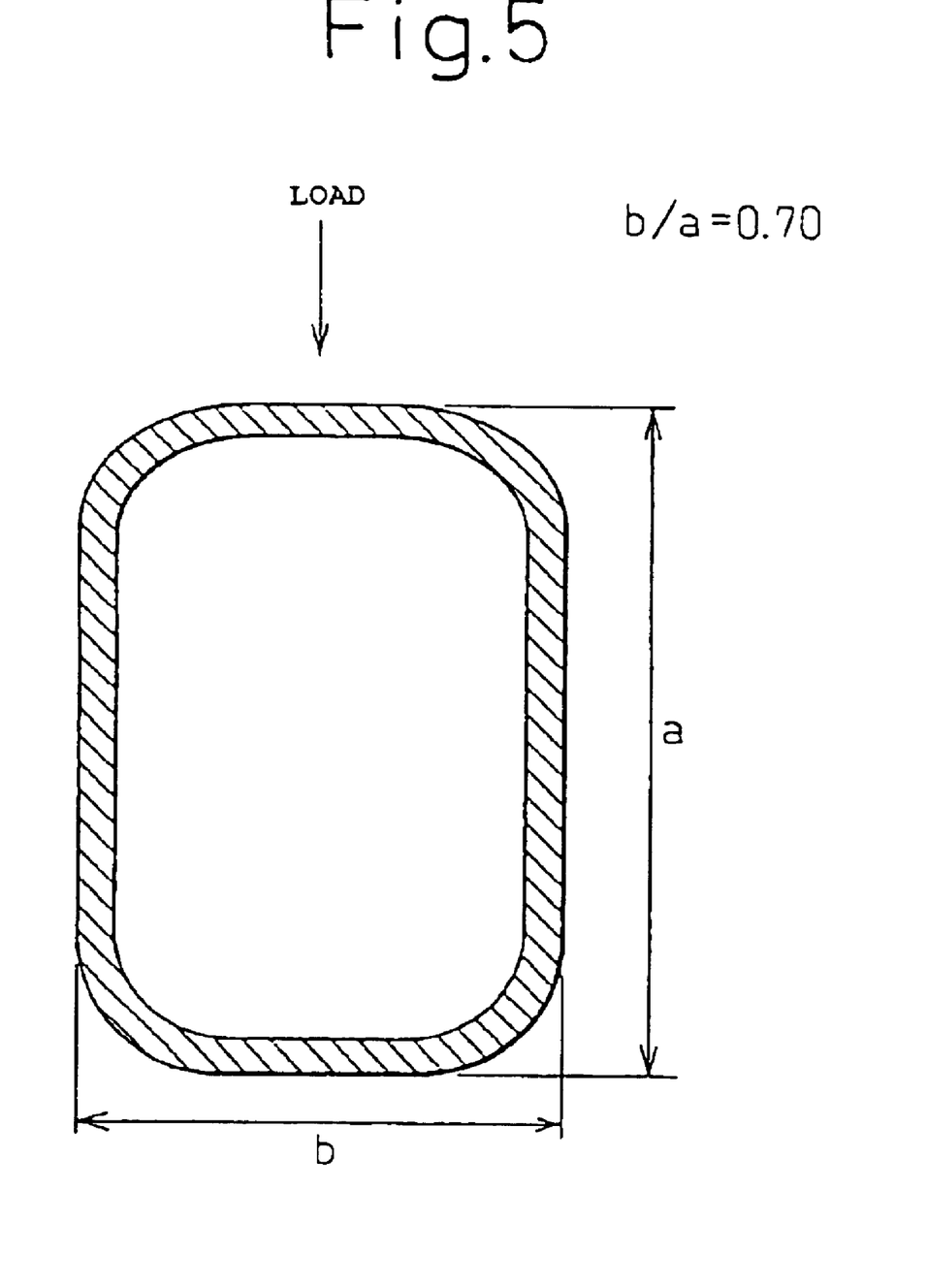
FIG. 5 is a sectional view showing another exemplary embodiment of the structural member according to the present invention.
Figure 6:
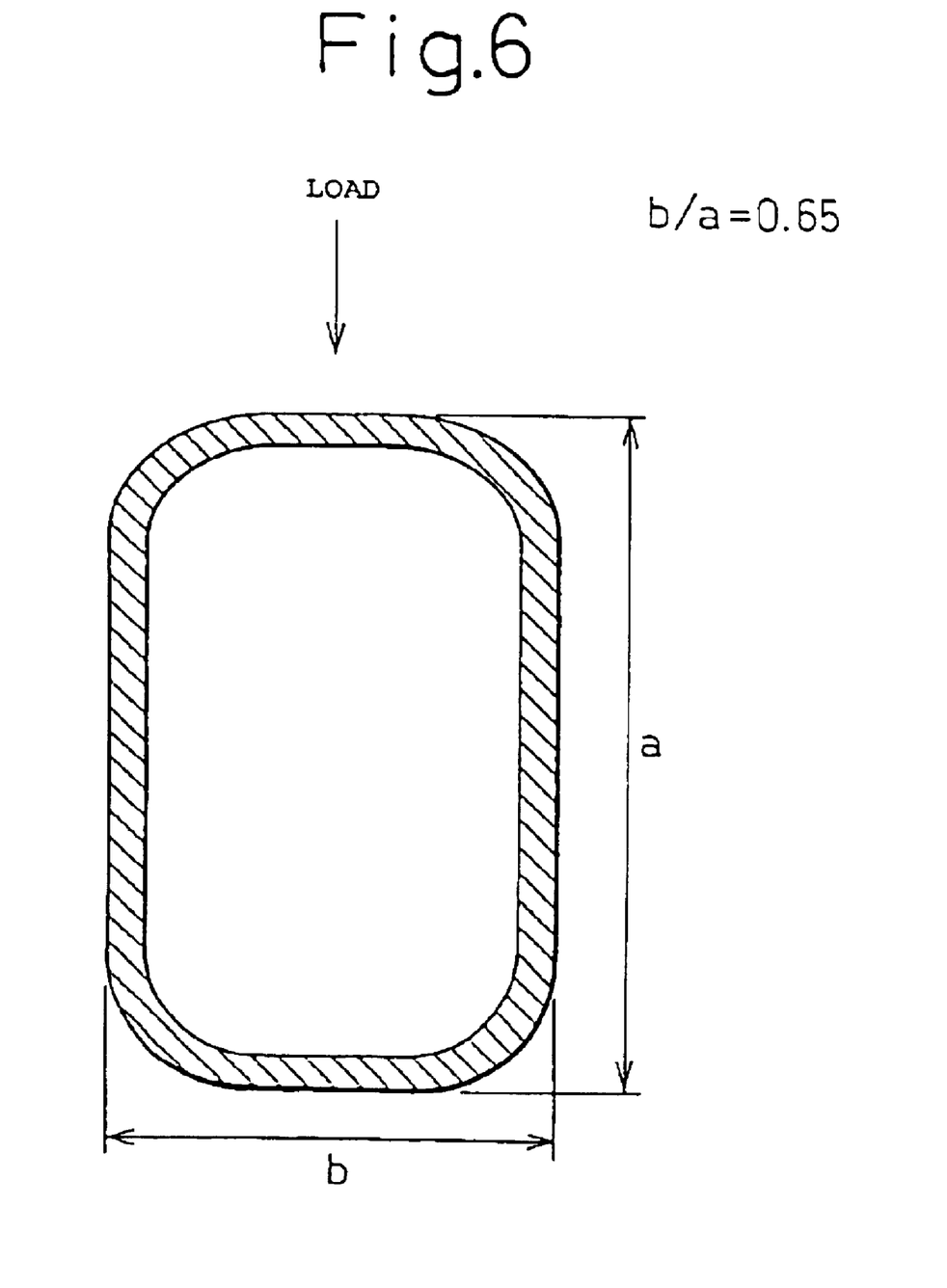
FIG. 6 is a sectional view showing yet another exemplary embodiment of the structural member according to the present invention.

The more the mass distribution is apart from the neutral axis of the beam cross-section perpendicular to the longitudinal direction of the beam, the more the flexural rigidity in the direction perpendicular to the direction of the long axis of the beam (steel pipe) improves. Therefore, it is preferable that the cross-sectional configuration of a beam is, for example, an oval having linear portions along the two long sides as shown in FIG. 4 or a substantially rectangular shape having linear portions along the two long sides and two short sides perpendicular to the long sides as shown in FIGS. 5 and 6, because flexural rigidity in the direction perpendicular to the direction of the long axis of the beam (steel pipe) is greatly improved.

Figure 7:
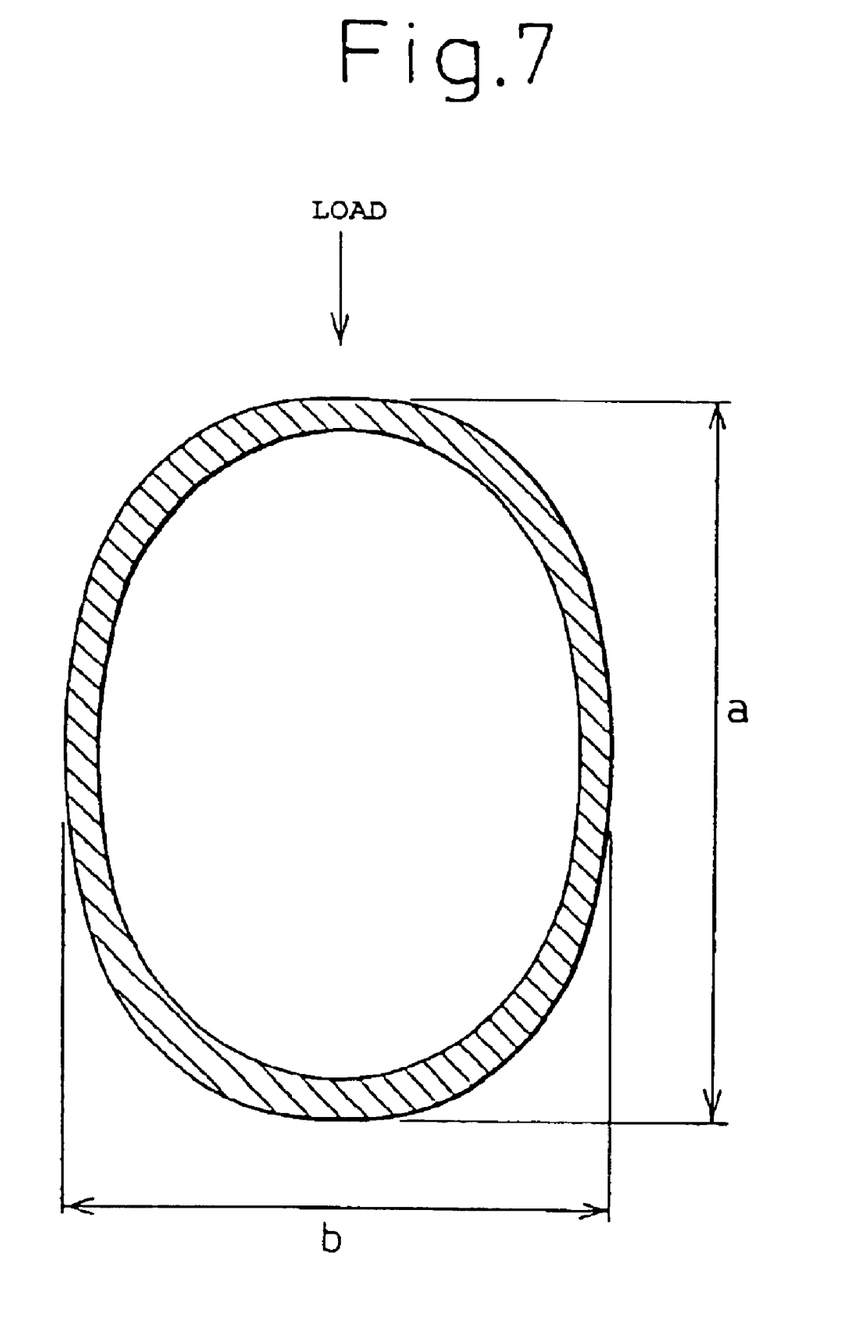
FIG. 7 is a sectional view showing still another exemplary embodiment of the structural member according to the present invention.

When the long sides have linear portions, there is a tendency to improve flexural rigidity in the direction perpendicular to the direction of the long axis of the beam (steel pipe) but to increase cracking after the occurrence of buckling. For alleviating the cracking caused by the buckling, it is preferable that the cross-sectional configuration has outward-convex curves along the long sides as shown in FIG. 7.

Figure 8:
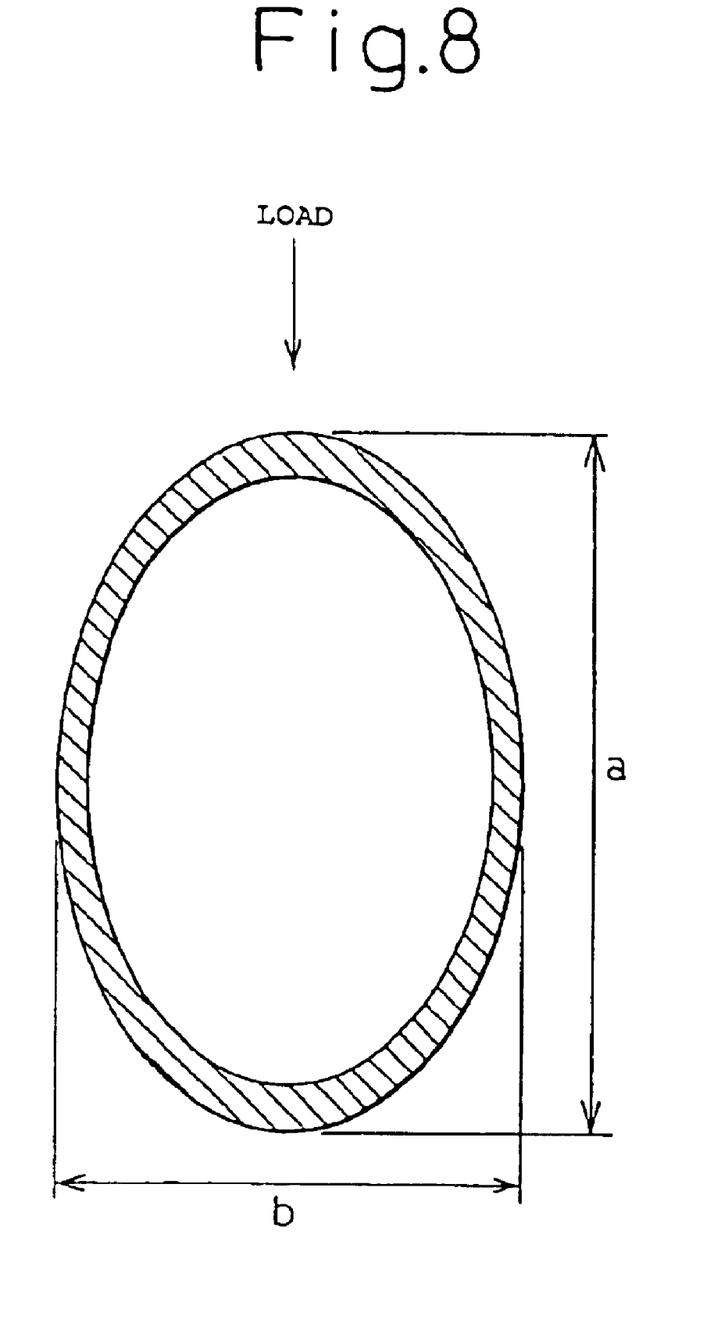
FIG. 8 is a sectional view showing a further exemplary embodiment of the structural member according to of the present invention.

In the case of a beam having an oval cross-sectional configuration wherein the long sides and the short sides connect each other via smooth curves as shown in FIG. 8, though there is a tendency to make the retention of the oval configuration unstable and to generate twists and bends of the beam at the time of a collision, buckling hardly occurs and the cracking caused by the buckling becomes extremely small and, therefore, an oval cross-sectional configuration can be applied to a beam.

Third, the disposition of a beam in a door or a car body is as follows. Since the cross-sectional configuration of an exemplary beam according to the present invention is not omnidirectional (not isotropic), which is different to a circular cross-sectional configuration, it is preferable to make the cross-sectional configuration directional so that the beam can demonstrate the maximum bending property when the beam is disposed in a door. That is, it is preferable to dispose a beam so that the longitudinal direction of the cross-sectional configuration of the beam coincides with the direction of the lateral collision when the beam is attached to a door. When a member is attached to a car body, it is preferable to dispose the member so that the longitudinal direction of the cross-sectional configuration of the member coincides with the direction of the collision. This is because the member is superior in flexural rigidity in the same direction as the longitudinal direction of the cross-sectional configuration as described above.

A structural member for a car according to the present invention can also be used as a pillar stiffening member, a bumper stiffening member or a structural member for a car body, in addition to a door-impact-protection beam.

EXAMPLE

Figure 3:
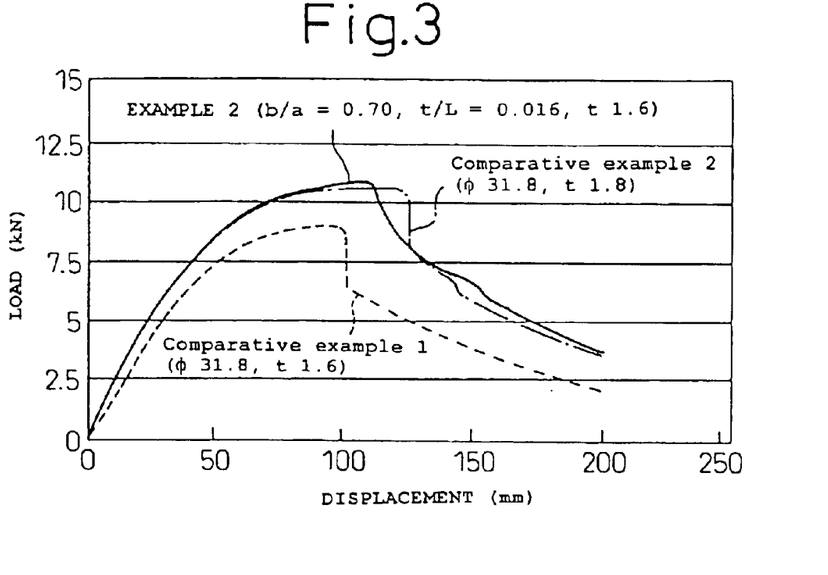
FIG. 3 is a graph showing the relation between a displacement and a load when test pieces are subjected to the three-point bending test at the span of 950 mm.
Figure 10:
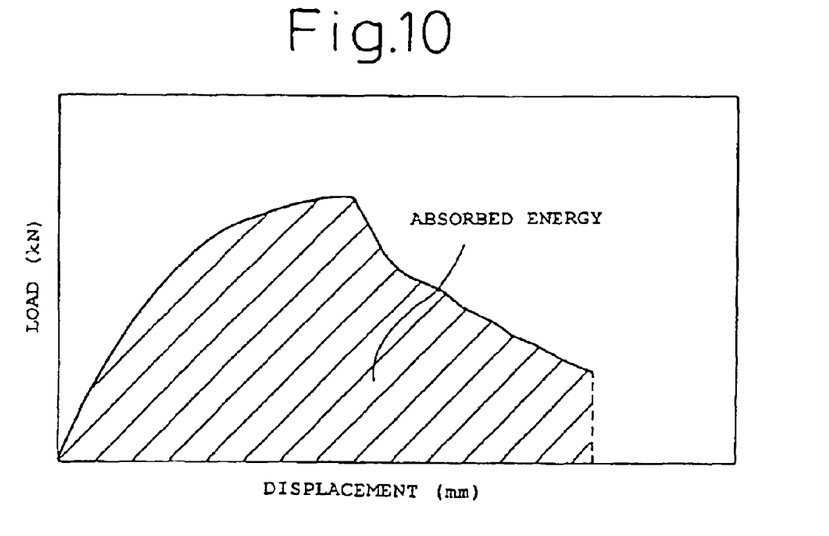
FIG. 10 is a graph showing the absorbed energy in the three-point bending test.

Beams having cross-sectional configurations with the dimensions and the various ratios shown in the Examples 1 to 3 of Table 1 were subjected to the three-point bending test (speed: 2 mm/s, indentation: 200 mm) at the span of 950 mm (I=950 mm). The results were satisfactory in the evaluation of both the maximum load and the absorbed energy. On the other hand, as comparative examples, a conventional type of beam having a circular cross section 31.8 mm in diameter and 1.8 mm in wall thickness (Comparative Example 1) and a light-weight-oriented beam having a circular cross section 31.8 mm in diameter and 1.6 mm in wall thickness (Comparative Example 2) were subjected to the three-point bending test likewise. Here, Examples 1, 2 and 3 correspond to FIGS. 4, 5 and 6, respectively. FIG. 3 shows the load-displacement curves of Example 2 and Comparative Examples 1 and 2 in the three-point bending test. It should be noted that the absorbed energy is in the region indicated with the oblique lines at the lower portion of the above-mentioned load-displacement curve in the three-point bending test as shown in FIG. 10.

Figure 9:
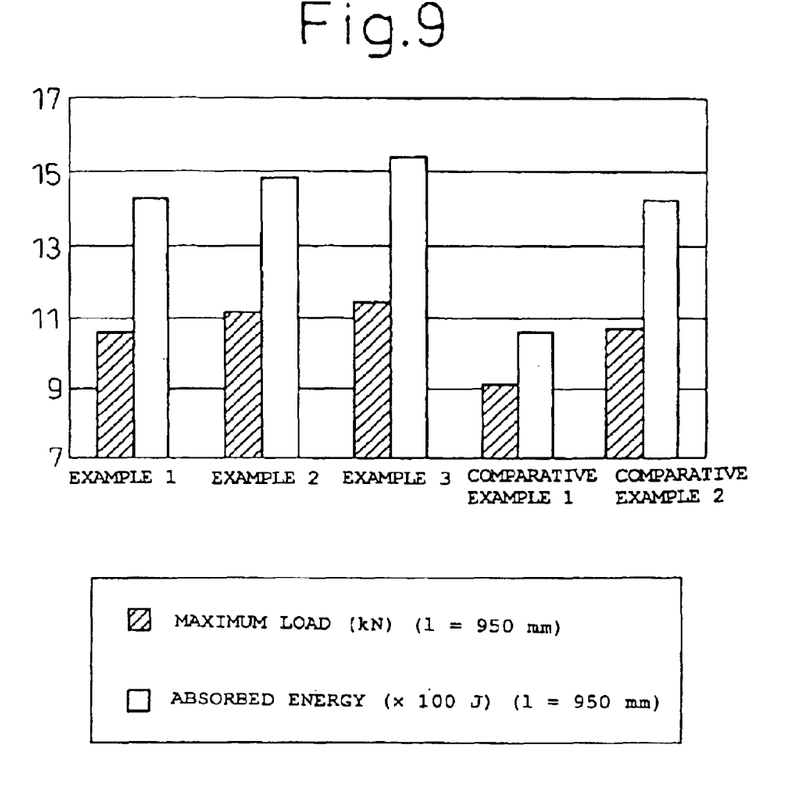
FIG. 9 is a graph showing the results of the three-point bending test in the examples according to the present invention and the comparative examples.

The results of the maximum load and absorbed energy obtained by subjecting the Examples and Comparative Examples to the three-point bending test are shown in FIG. 9.

As is apparent from the results, it was confirmed that the beams according to the present invention, while having the same weight as the light-weight type beam having the circular cross section 31.8 mm in diameter and 1.6 mm in wall thickness, showed the same performance in both the maximum load and absorbed energy as the beam having the circular cross section 31.8 mm in diameter and 1.8 mm in wall thickness, and demonstrated excellent configurational performances (FIG. 9).

INDUSTRIAL APPLICABILITY

As is apparent from the above explanation, the present invention makes it possible to reduce the weight of a structural member for a car (for example, a door-impact-protection beam which is a door stiffening member, a pillar stiffening member, a bumper stiffening member) and a car body by demonstrating high flexural strength and absorbed energy performance compared with a conventional steel pipe with a circular cross section when a car collision, particularly a lateral collision, occurs.

What is claimed is:

1. A structural member for a vehicle, comprising:
at least one section being formed with a high-tensile steel pipe having a material property of at least 1,400 MPa in tensile strength and at least 5% in elongation, the at least one section having a cross-sectional configuration of a closed section structure, the cross-sectional configuration satisfying the following expression:

$$0.65 \leq b/a \leq 0.75, \text{ and}$$
$$0.014 \leq t/L \leq 0.020,$$

wherein:
a is a first maximum length of the cross-sectional configuration in a longitudinal direction,
b is a second maximum length of the cross-sectional configuration in a direction perpendicular to the longitudinal direction,
L is a circumferential length of the cross-sectional configuration, and
t is a wall thickness of the steel pipe.

2. The structural member according to claim 1, wherein the cross-sectional configuration has a linear portion at at least one portion of sides of the at least one section.

3. The structural member according to claim 1, wherein all sides of the cross-sectional configuration are formed with curves.

4. The structural member according to claim 1, wherein the cross-sectional configuration is an ellipse.

5. The structural member according to claim 1, wherein the at least one section is disposed so that the longitudinal direction of the cross-sectional configuration of the at least one section coincides with a direction of a collision of a body of the vehicle when the structural member is attached to the body of the vehicle.

6. The structural member according to claim 1, wherein the at least one section is configured as a door-impact-protection beam that is disposed so that the longitudinal direction of the cross-sectional configuration coincides with a direction of a lateral collision of a door of the vehicle when the structural member is attached to the door.

TABLE 1

|  | Tensile strength (Mpa) | Elongation (%) | Dimension | | | | | | Maximum load (kN) (l = 950 mm) | Absorbed energy (J) (l = 950 mm) |
|---|---|---|---|---|---|---|---|---|---|---|
|  |  |  | a | b | L | t | b/a | t/L |  |  |
| Example 1 | 1608 | 12.2 | 34 | 24.5 | 100 | 1.6 | 0.72 | 0.016 | 10.59 | 1427 |
| Example 2 | 1625 | 11.8 | 33 | 23 | 100 | 1.6 | 0.70 | 0.016 | 11.18 | 1484 |
| Example 3 | 1636 | 11.2 | 34 | 22 | 100 | 1.6 | 0.65 | 0.016 | 11.43 | 1539 |
| Comparative example 1 | 1642 | 12.2 | 31.8 | 31.8 | 100 | 1.6 | 1.00 | 0.016 | 9.07 | 1058 |
| Comparative example 2 | 1651 | 12.7 | 31.8 | 31.8 | 100 | 1.8 | 1.00 | 0.016 | 10.69 | 1422 |

7. A vehicle body, comprising:

a structural member formed with a high-tensile steel pipe having a material property of at least 1,400 MPa in tensile strength and at least 5% in elongation, the member having a cross-sectional configuration of a closed section structure, the cross-sectional configuration satisfying the following expression:

$0.65 \leq b/a \leq 0.75$, and $0.014 \leq t/L \leq 0.020$, wherein:
- a is a first maximum length of the cross-sectional configuration in a longitudinal direction,
- b is a second maximum length of the cross-sectional configuration in a direction perpendicular to the longitudinal direction,
- L is a circumferential length of the cross-sectional configuration, and
- t is a wall thickness of the steel pipe, and wherein the structural member is disposed so that the longitudinal direction of the cross-sectional configuration of the structural member coincides with a direction of a collision of the vehicle body.

8. The vehicle body according to claim 7, wherein the cross-sectional configuration has a linear portion at at least one portion of sides of the structural member.

9. The vehicle body according to claim 7, wherein all sides of the cross-sectional configuration are formed with curves.

10. The vehicle body according to claim 7, wherein the cross-sectional configuration is an ellipse.

11. The vehicle body according to claim 7, wherein the structural member is disposed so that the longitudinal direction of the cross-sectional configuration of the structural member coincides with a direction of the collision of the vehicle body when the structural member is attached to the vehicle body.

12. The vehicle body according to claim 7, wherein the structural member is configured as a door-impact-protection beam that is disposed so that the longitudinal direction of the cross-sectional configuration coincides with a direction of a lateral collision of a door of the vehicle when the structural member is attached to the door.

* * * * *

UNITED STATES PATENT AND TRADEMARK OFFICE
CERTIFICATE OF CORRECTION

PATENT NO. : 6,908,141 B2
DATED : June 21, 2005
INVENTOR(S) : Hiroyuki Doi et al.

It is certified that error appears in the above-identified patent and that said Letters Patent is hereby corrected as shown below:

Column 2,
Line 4, "and at least than 5 %" should read -- and at least 5% --;

Column 5,
Line 27, "Comparative example 1" should read -- Comparative example 2 --;
Line 30, "Comparative example 2" should read -- Comparative example 1 --;
Table 1 (under Tensile Strength): "Mpa" should read -- MPa --;

Column 6,
Line 33, "linear portion at at least" should read -- linear portion of at least --; and Column 8,
Line 4, "linear portion at at least" should read -- linear portion at least --.

Signed and Sealed this

Fifteenth Day of November, 2005

JON W. DUDAS
*Director of the United States Patent and Trademark Office*